United States Patent
Schmidt et al.

(10) Patent No.: US 8,233,050 B2
(45) Date of Patent: Jul. 31, 2012

(54) MULTIPLE VIEW INFRARED IMAGING SYSTEM

(75) Inventors: Matthew F. Schmidt, Lino Lakes, MN (US); Kirk Johnson, Rogers, MN (US); Shane M. Anderson, New Brighton, MN (US)

(73) Assignee: Fluke Corporation, Everett, WA (US)

( * ) Notice: Subject to any disclaimer, the term of this patent is extended or adjusted under 35 U.S.C. 154(b) by 1647 days.

(21) Appl. No.: 11/553,373

(22) Filed: Oct. 26, 2006

(65) Prior Publication Data

US 2008/0099683 A1  May 1, 2008

(51) Int. Cl.
*H04N 5/33* (2006.01)
(52) U.S. Cl. ........................ 348/164; 250/353
(58) Field of Classification Search .................. 348/164; 250/353
See application file for complete search history.

(56) References Cited

U.S. PATENT DOCUMENTS

| 4,876,445 A * | 10/1989 | McMaster .................. 250/221 |
| 6,023,061 A | 2/2000 | Bodkin |
| 6,696,958 B2 * | 2/2004 | Anderson .................. 340/578 |
| 7,348,562 B2 * | 3/2008 | Irani ...................... 250/339.02 |
| 2003/0002124 A1 * | 1/2003 | Green et al. .............. 359/237 |
| 2003/0132847 A1 * | 7/2003 | Anderson .................. 340/578 |
| 2004/0145482 A1 * | 7/2004 | Anderson .................. 340/578 |
| 2004/0174472 A1 * | 9/2004 | Park ......................... 349/95 |

* cited by examiner

*Primary Examiner* — Mohamed Wasel
(74) *Attorney, Agent, or Firm* — Fredrikson & Byron, P.A.

(57) ABSTRACT

An infrared imaging system used for providing images from a plurality of views. The multiple view infrared imaging system includes a plurality of lens and infrared focal plane array (FPA) pairings, wherein each pairing can be used to provide an image and/or sample scene data of a distinct view. A single set of processing circuitry and a single set of one or more output elements may be utilized to provide such images. A multi-input switch may be utilized in combination with the single set of processing circuitry and output elements to provide images from any of the lens and FPA pairings based on the positioning of the switch.

33 Claims, 2 Drawing Sheets

MULTIPLE VIEW INFRARED IMAGING SYSTEM

TECHNICAL FIELD

Embodiments of the present invention pertain to imaging systems and, more particularly, to imaging systems configured to gather images and/or sample scene data from multiple views.

BACKGROUND

As is known, infrared imaging devices generally employ a single lens working with a corresponding infrared focal plane array (FPA) to provide an image of a view in a particular axis. In turn, such imaging devices are limited to providing an image of a single view only. In order to provide images from a plurality of views, with each image being in a distinct axis, a plurality of infrared imaging devices would typically be needed, with each imaging device providing one of the images. Alternatively, some imaging systems can be configured to gather images from different directions via a motorized pivoting gimbal system while employing a single lens. As such, what is needed is an infrared imaging system that provides multiple view imaging functionality, yet does not involve a plurality of infrared imaging devices or use of a gimbal system.

In addition, there are constant demands to make infrared imaging devices lighter and more compact, and thus, easier to handle when using. In turn, efforts are continually being made to reduce the physical size and mass of such imaging devices. However, an obstacle to such efforts involves maintaining the imaging optics and electronics of such devices, and thereby maintaining the corresponding desired functionality and powering demands of such devices. In light of this, what is needed is an infrared imaging system that provides the above-described multiple view imaging functionality, yet is both compact and efficient.

SUMMARY

Embodiments of the invention involve an infrared imaging system used for providing images from a plurality of views. The multiple view infrared imaging system includes a plurality of lens and infrared focal plane array (FPA) pairings, wherein each pairing can be used to provide an image and/or sample scene data of a distinct view. In certain embodiments, a single set of processing circuitry and a single set of one or more output elements is utilized to provide such images. In certain embodiments, a multi-input switch is utilized in combination with the single set of processing circuitry and output elements to provide images from any of the lens and FPA pairings based on the positioning of the switch.

In one embodiment, an infrared imaging system is provided, comprising a plurality of lenses, a plurality of infrared focal plane arrays, and processing circuitry. Each of the lenses is configured to focus on a view and configured to receive image information in the form of infrared energy there through from the corresponding view. The arrays are each paired with one of the plurality of lenses, with each of the lenses adapted to direct the infrared energy from the corresponding view onto its paired array. The processing circuitry is selectively connectable to any one of the arrays, with the circuitry adapted to process signals stemming from the one array.

In another embodiment, an infrared imaging system is provided, comprising a plurality of lenses, a plurality of infrared focal plane arrays, and one or more output elements. Each of the lenses is configured to focus on a view and configured to receive image information in the form of infrared energy there through from the corresponding view. The arrays are each paired with one of the plurality of lenses, with each of the lenses adapted to direct the infrared energy from the corresponding view onto its paired array. The one or more output elements are selectively connectable to any one of the arrays, with the output elements comprising one or more of a display and memory. The display is adapted to create an image from the signals stemming from the one array, and the memory is adapted for storing the signals stemming from the one array.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

DETAILED DESCRIPTION

Figure 1:
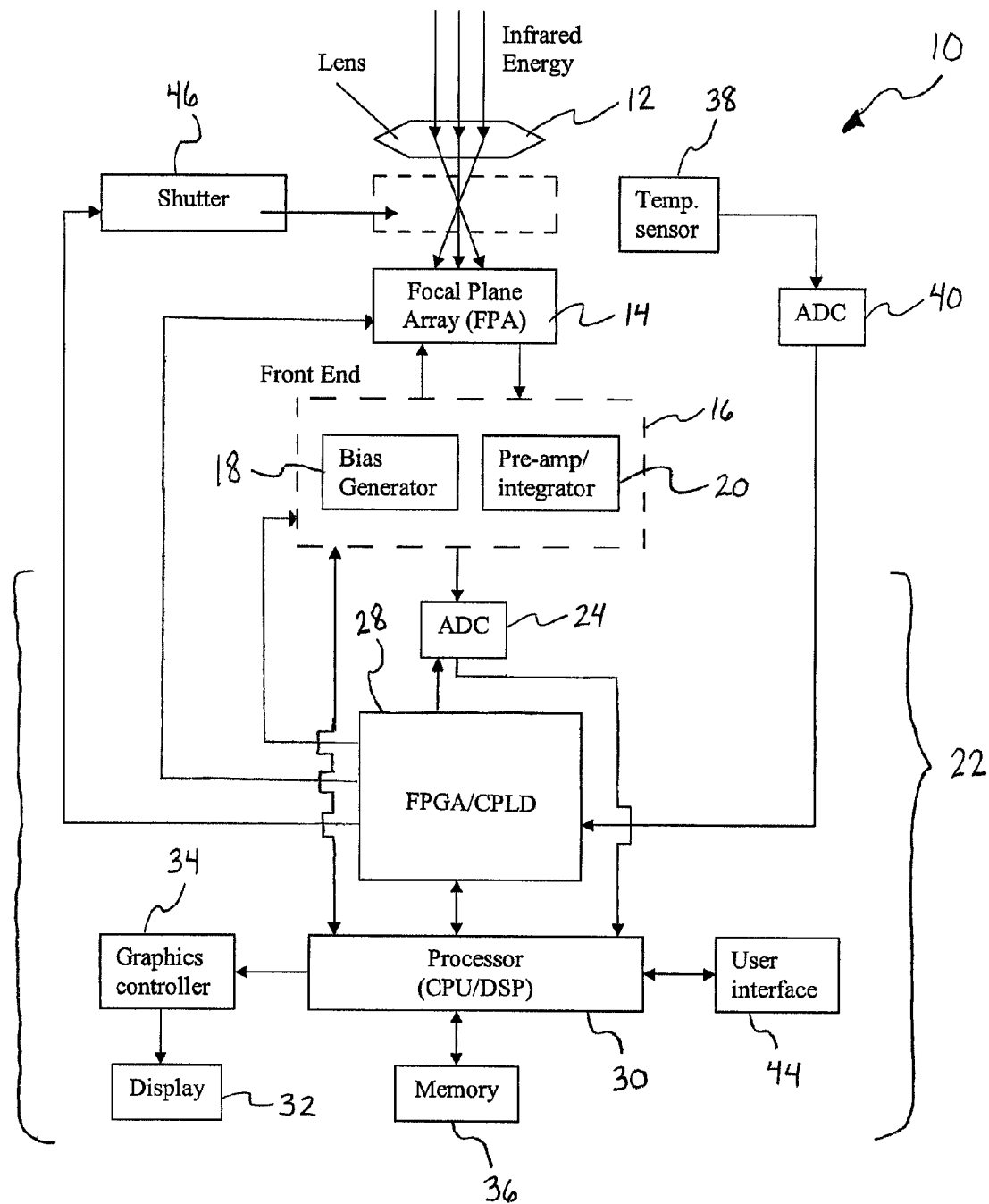
FIG. 1 is a block diagram representation of an exemplary infrared imaging system having a single lens and infrared focal plane array.

The following detailed description is exemplary in nature and is not intended to limit the scope, applicability, or configuration of the invention in any way. Rather, the following description provides practical illustrations for implementing exemplary embodiments of the present invention. In the foregoing detailed description, the invention has been described with reference to specific embodiments. However, it may be appreciated that various modifications and changes can be made without departing from the scope of the invention as set forth in the appended claims.

As briefly described above, when designing an infrared imaging device, a common goal is to provide as efficient a device as possible. In some instances, this can involve designing the device to provide the same functionality as previously achieved, but with fewer electronic components. By limiting the quantity of electronic components within the imaging device, the cost of producing the device can be reduced. In addition, overall energy consumption of the device can often be reduced. Finally, in some cases, the size (e.g., volume and/or mass) of the device can be reduced. As a result, many further advantages can be realized. One of these can include making the device easier to handle for users.

As is known, one or more controllers and/or processors are used within infrared imaging devices to provide a plurality of functions. As a consequence of increasing such device's efficiency, other advantages can likely be realized with respect to such controllers and/or processors housed therein. For example, if the infrared imaging device is designed with fewer electronic components which normally function either on or with the one or more controllers and/or processors, the space thereon usually dedicated for such functioning could be freed up to be used elsewhere. As such, the controllers and/or processors can be made more versatile so as to provide further functioning for the device. Alternatively, the quantity of controllers and/or processors could be decreased, which in turn, could lead to a reduction in size of the device.

Certain embodiments of the invention involve an infrared imaging system used for providing images and/or sampling scene data of a plurality of views. As described above, conventional infrared imaging devices have generally been limited to having single lenses and corresponding single infrared focal plane arrays (FPAs). In turn, each such device has been confined to providing an image and/or sampling scene data of a single view. As further described below, the multiple view infrared imaging system described herein is designed to include a plurality of lens and infrared focal plane array (FPA) pairings, wherein each pairing can be used to provide an image and/or sample scene data of a distinct view.

In order to provide an image and/or sample scene data of any one of the views, an FPA of a corresponding lens and FPA pairing is electrically connected to processing circuitry. In creating an image based on the output signals ascertained from the FPA, the processing circuitry can be designed to function with one or more output elements, as further described below. Conversely, in sampling scene data based on the output signals ascertained from the FPA, the processing circuitry can be designed to function with other devices or systems, e.g., in process control/factory automation or alarm applications. In certain embodiments, the FPAs are microbolometer arrays; however, the invention should not be limited to such. Further information concerning known varieties of microbolometer arrays is provided both in U.S. Pat. Nos. 6,444,983 and 6,465,785, the teachings of which are incorporated herein in relevant part.

As described above, there are constant demands to make infrared imaging systems as compact and efficient as possible. Eliminating duplicative electrical components and/or streamlining controller functioning are two ways of making the systems more compact and efficient. For example, as noted above, to provide any one of the distinct images from the multiple view infrared imaging system, an FPA of a corresponding lens and FPA pairing is electrically connected to processing circuitry and one or more output elements. One embodiment of such an imaging system can involve having distinct sets of processing circuitry and output elements associated with each lens and FPA pairing. Unfortunately, such redundant sets of electronics would take up valuable space within the imaging system. In turn, the redundant sets of electronics would have a negative impact on the size of the imaging system. It has been found to be more efficient to utilize a single set of processing circuitry and one or more output elements (if necessitated) which can be used for every lens and FPA pairing, as will be further described below. In certain embodiments, structures can be provided to accommodate the multiple view systems in a space saving manner. Some such embodiments are discussed in the U.S. Patent Application entitled "Integrated Multiple Imaging Device", which is filed concurrently herewith.

In certain embodiments, a multiple view infrared imaging system is provided having a limited amount (e.g., a single set) of processing circuitry and output elements, while still employing the same quantities of lenses and FPAs as described herein for the inventive multiple view infrared imaging systems. As will be further described and illustrated below, in certain embodiments, such processing circuitry and output elements are used to create an image from the output from one of the FPAs. Therefore, the processing circuitry and output elements are only connected to one of the FPAs at any given time. As a result, the processing circuitry and output elements, generally occurring after the lens and FPA pairings, can be represented in the system but once. Advantages of such a system include (i) conservation of volumetric space of the system, (ii) reduction of total mass of the system, and (iii) reduction of power demand of the system and, in turn, conservation of battery life of the system.

In certain embodiments, by utilizing a multi-input switch in combination with such above-mentioned single set of processing circuitry and output elements, a system is provided in which the signals stemming from any of the lens and FPA pairings can be selectively delivered based on the positioning of the switch. For example, after positioning the switch so as to electrically connect one of the lens and FPA pairings to the processing circuitry, an image can be created by the imaging system (via the output elements) corresponding to the view and signals provided via the one lens and FPA pairing. Subsequently, the switch can be rotated to the other lens and FPA pairings as desired. For example, the switch can be rotated sequentially so as to likewise provide images from each of the pairings. In certain embodiments, a timing controller can be utilized to operate the switch, whereby the switch can be made to rotate between each of the lens and FPA pairings at very high sampling rates. In turn, in such embodiments, the system can not only be designed to provide images from each of the lens and FPA pairings, but also can be configured to continually maintain such images over time via the output elements, as is further described herein.

FIG. 1 shows a block diagram representation of an exemplary infrared imaging system 10, with such system 10 having a single lens 12 and a single infrared FPA 14. Typically, the system 10 would be at least partially housed within a camera to form a single unit. In operation, the system 10 receives image information in the form of infrared energy through the lens 12, and in turn, the lens 12 directs the infrared energy onto the FPA 14. The combined functioning of the lens 12 and FPA 14 enables further electronics within the imaging system 10 to create an image on an axis based on the image view captured by the lens 12, as described below.

The FPA 14 can include a plurality of infrared detector elements (not shown), e.g., including bolometers, photon detectors, or other suitable infrared detectors well known in the art, arranged in a grid pattern (e.g., an array of detector elements arranged in horizontal rows and vertical columns). The size of the array can be provided as desired. For example, an array of 160×120 detector elements can be employed, but the invention should not be limited to such. In certain embodiments involving bolometers as the infrared detector elements, each detector element is adapted to absorb heat energy from a scene of interest (focused upon by the lens 10) in the form of infrared radiation, resulting in a corresponding change in its temperature, which results in a corresponding change in its resistance. With each detector element functioning as a pixel, a two-dimensional image or picture representation of the infrared radiation can be further generated by translating the changes in resistance of each detector element into a time-multiplexed electrical signal that can be visualized on a display or stored in memory (e.g., of a computer). Further circuitry downstream from the FPA 14, as is described below, is used to perform this translation. Incorporated on the FPA 14 is a Read Out Integrated Circuit (ROIC), which is used to output signals corresponding to each of the pixels. Such ROIC is commonly fabricated as an integrated circuit on a silicon substrate. The plurality of detector elements may be fabricated on top of the ROIC, wherein their combination provides for the FPA 14.

As described above, the FPA 14 generates a series of electrical signals corresponding to the infrared radiation received by each infrared detector element to represent a thermal image. A "frame" of thermal image data is generated when the voltage signal from each infrared detector element is obtained by scanning all of the rows that make up the FPA 14. Again, in certain embodiments involving bolometers as the infrared detector elements, such scanning is done by switching a corresponding detector element into the system circuit and applying a bias voltage across such switched-in element. Successive frames of thermal image data are generated by repeatedly scanning the rows of the FPA 14, with such frames being produced at a rate sufficient to generate a video representation of the thermal image data.

The signals generated by the FPA 14 are initially conditioned by a front-end stage 16 of the imaging system 10. In certain embodiments, as shown, the front-end stage 16 includes a bias generator 18 and a pre-amp/integrator 20. In addition to providing the detector bias, the bias generator 18 can optionally subtract an average bias current from the total current generated for each switched-in detector element. The average bias current can be subtracted in order (i) to compensate for deviations to the entire array of resistances of the detector elements resulting from changes in ambient temperatures inside the imaging system 10 and (ii) to compensate for array-to-array variations in the average detector elements of the FPA 14. Following provision of the detector bias and optional subtraction of the average bias current, the signals are passed through the pre-amp/integrator 20. Typically, the pre-amp/integrator 20 is used to condition incoming signals, e.g., prior to their digitization. As a result, the incoming signals can be adjusted to a form that enables more effective interpretation of the signals, and in turn, can lead to more effective resolution of the created image.

Subsequently, the conditioned signals are sent downstream into a back end 22 of the circuit of the imaging system 10. Generally, the back end 22 includes processing circuitry and optionally, one or more output elements. As should be appreciated, and as described above, in certain embodiments, the one or more output elements would generally be used when images are created or may in the future need to be created; however, the invention should not be limited to such. Conversely, in certain embodiments, when the processing circuitry is used for sampling scene data, the one or more output elements is generally not necessitated.

The processing circuitry, in certain embodiments, can include one or more of a field-programmable gate array (FPGA)/complex programmable logic device (CPLD) controller 28 and a processor 30 (e.g., computer processing unit (CPU) or digital signal processor (DSP)). With respect to the terminology used herein, it is to be understood that "one or more" of a set of separate single components means any one, or alternatively, any combination, of the separate single components, and not multiples of any of the separate single components. In addition to providing needed processing for infrared imagery, as described above, it is well known that the processing circuitry can be employed for a wide variety of additional functions, e.g., involving temperature conversion (radiometry) for applications relating to automatic target detection and/or recognition for military, fire detection, intrusion alarms, fusion with data and/or imagery from other types of sensors, people counting, factory process automation, etc.

In certain embodiments, the processing circuitry can also include an ADC 24; however, the invention should not be limited to such. For example, in certain embodiments, the ADC 24 could just as well be integrated with the front end stage 16, and optionally, integrated into the ROIC incorporated on the FPA 14 (as described above). The signals conditioned by the bias generator 18 and pre-amp/integrator 20 are digitized via the ADC 24. Subsequently, the digitized thermal image signals are sent from the ADC 24 to the processor 30.

In an alternate embodiment, the signals can be sent from the ADC 24 to the processor 30 via the controller 28. In turn, the processor 30 can process and send signals to one or more of the output elements. In certain embodiments, the processor 30 could send the signals directly to one or more of the output elements, or indirectly, e.g., via a radio downlink, network, internet, etc.

Generally, the output elements include one or more of a display 32 and memory 36. In certain embodiments, the signals can be sent through a graphics controller 34, which outputs to the display 32 for creating an image thereon for viewing by a user. As should be appreciated, the display 32 can involve any of a variety of differing displays. For example, the display 32 can include a video display, a liquid crystal display (LCD), a color/grayscale display, or the like; however, the invention should not be so limited. Further, in certain embodiments, as shown, the processor 30 may also or instead send the signals to the memory 36 for future use. The memory 36 can be used to additionally handle a range of functions related to processing image signals. In certain embodiments, the memory 36 can include Random Access Memory (RAM); however, the invention should not be limited to such.

In certain embodiments involving bolometers as the infrared detector elements, if changes in ambient temperature cause the resistances of the detector elements of the FPA 14 to undesirably deviate, the output signal of the integrating portion of the pre-amp/integrator 20 may drop outside the readable range of the ADC 24. As such, the average current bias can be adjusted to ensure the output signals of the pre-amp/integrator 20 stay within the readable range of the ADC 24. For example, a temperature sensor 38 is located proximate to the FPA 14 and measures temperature representative of the overall temperature of the FPA 14. The temperature sensor 38 generates a temperature signal which is converted to a digital signal by an ADC 40 and provided to a timing control portion of the FPGA/CPLD controller 28. In brief, the signals transmitted from the temperature sensor 38 via the ADC 40 and the FPGA/CPLD controller 28 enable the processor 30 to determine whether the ambient temperature inside the imaging system 10, and proximate to the FPA 14, has changed, and if so, whether the average bias current may need to be adjusted.

In certain embodiments, user interface 44 is electrically connected to the processor 30. The user interface 44 can be configured or programmed to initiate automatic offset compensation according to a variety of scenarios. For example, offset compensation may be initiated (i) periodically at fixed intervals (e.g., once every few minutes) and/or (ii) when the temperature measured by the temperature sensor 38 changes by a specified amount (e.g., by 1° C.). Upon a determination that offset compensation is to be performed, the user interface 44 can send an initiation signal to the processor 30, which in turn, communicates with the timing control portion of the FPGA/CPLD controller 28. Subsequently, the FPGA/CPLD controller 28 can generate the necessary signal(s) to cause a shutter 46 to be positioned in a closed position (i.e., placed between the lens 12 and the FPA 14, as indicated by dashed lines) to initiate the offset compensation.

Offset compensation is performed to block external infrared energy from reaching the FPA 14, thereby providing the FPA 14 with a uniform infrared energy scene (i.e., via the shutter 46 being closed). As such, the offset corrections (e.g., the average bias current) for each infrared detector element are measured and adjusted via the bias generator 18 until the average output signal of the pre-amp/integrator 20 is at an appropriate level within the readable range of the ADC 24. Subsequently, the offset corrections are stored within the controller 28 and/or the processor 30, and optionally, the bias generator 18, to be later applied to the output of each infrared detector element of the FPA 14 during normal operation.

The shutter 46 can alternately be opened or closed based upon a manual command provided by an operator/user of the imaging system 10. Such a manual command may occur by a pushbutton command. In certain embodiments, such command can be initiated by a user at the user interface 44. Manual shutter commands, in certain embodiments, can be further initiated, for example, by a mouse/cursor command via user-interface software, by an RS-232 serial interface, or by other comparable communication methods.

It should be appreciated that FIG. 1 (and FIG. 2 similarly described below), illustrating the ADC 24, the controller 28, the processor 30, the display 32, the graphics controller 34, the memory 36, and the user interface 44 as separate components, is but one certain embodiment of the invention. In turn, such embodiment is not meant to limit the invention to such. It should be appreciated that any combination of these components can just as well be integrated into a single component (e.g., involving one integrated circuit chip set) without departing from the spirit of the invention.

Figure 2:
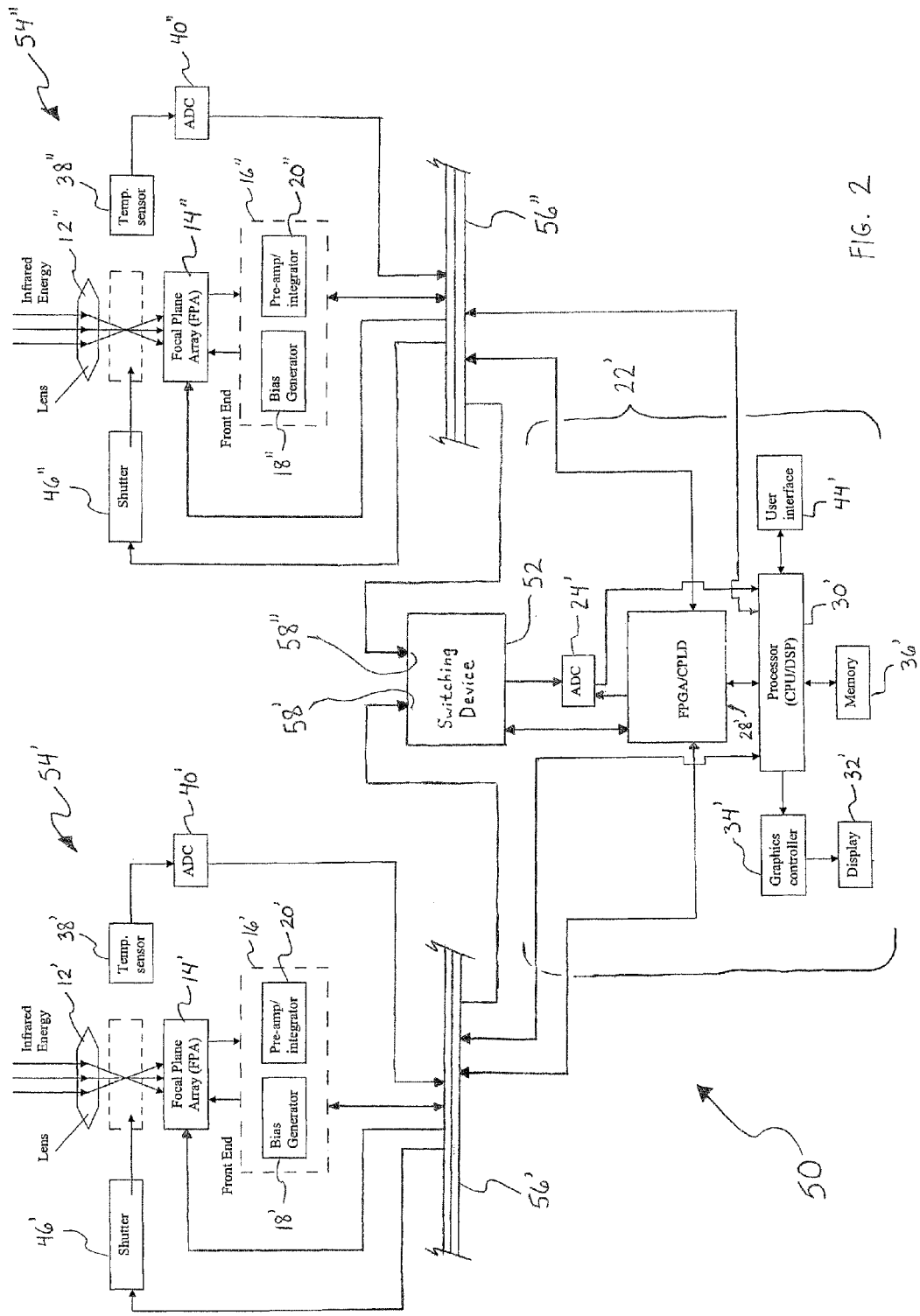
FIG. 2 is a block diagram representation of an exemplary infrared imaging system having multiple lens and infrared focal plan array pairings in accordance with embodiments of the invention.

FIG. 2 illustrates an exemplary block diagram of an imaging system 50 in accordance with certain embodiments of the invention. As should be appreciated, the system 50 is a multiple view infrared imaging system. As such, in contrast to the system 10 illustrated in FIG. 1, the system 50 has multiple lenses 12', 12", each respectively paired with a corresponding infrared focal plane array (FPA) 14', 14" to provide images of multiple views. Because the system 50 employs such multiple lens and FPA pairings, in certain embodiments, as shown, an electrical framework similar to what is shown in FIG. 1 (for the one lens 12 and FPA 14 pairing) is generally provided for each of the pairings.

While the imaging system 50 of FIG. 2 only shows two lens and FPA pairings, the invention should not be limited to such. Instead, embodiments of the system 50 can include any plurality of lens and FPA pairings, with such plurality corresponding to a desired number of distinct views from which an image can be created. For example, a system in accordance with certain embodiments of the invention may include any number of (e.g., more than two) lens and FPA pairings which are warranted to cover an extended field of a single view, with each image provided via each pairing accounting for a distinct plane of such extended field of view.

Similar to what is described above with respect to the system 10 of FIG. 1, each FPA 14', 14" of each lens and FPA pairing of the system 50 is further electrically connected to circuitry located downstream in the system 50. Some of the circuitry is provided for conditioning the signals from the FPA 14', 14". For example, each FPA 14', 14" of each lens and FPA pairing is respectively connected to a front-end stage 16', 16". In certain embodiments, each of the front-end stages 16', 16" can respectively include a bias generator 18', 18" and a pre-amp/integrator 20', 20"; however, the invention should not be limited to such. As should be appreciated, if the FPAs 14', 14" are well matched, bias generation can be shared via a single bias generator. Some of the circuitry located further downstream is in a back end 22' of the circuit of the system 50. As described above, the back end 22' includes processing circuitry configured for processing the conditioned signals stemming from any of the front-end stages 16', 16". Additionally, the back end 22' includes one or more output elements used to store the processed signals and/or provide images of views from the processed signals.

In use, the system 50 can provide images of a plurality of views. Initially, each of the plurality of lens 12', 12" can be used to focus on distinct views. In turn, each of the FPAs 14', 14" can be used to provide signals based on the views from the lenses 12', 12". The signals from the FPAs 14', 14" can then be conditioned via the corresponding front-end stages 16', 16". In turn, any of the front-end stages 16', 16" can be connected to circuitry of the back end 22' of the circuit so that the corresponding conditioned signals can be processed. As such, using output element(s) of the back end 22', an image can be provided from such processed signals and/or the processed signals can be stored for future use.

As described above, the multiple view infrared imaging system 50 is adapted to switch from one view to another in order to provide images in distinct axes. As shown in FIG. 2, one manner in which one can provide a compact and efficient system is to use a switching device early in the information data path of the circuit. As such, one can use the switching device to selectively determine which lens and FPA pairing will be used for any given time early in the circuit flow. In turn, one can eliminate the need for much of the redundant digital and/or analog electronics typically employed in repetitive electrical frameworks. An exemplary implementation of such is illustrated in FIG. 2 and described below.

As shown, the multiple view infrared imaging system 50 includes a switching device 52. In certain embodiments, the switching device 52 can be generally located between each of the lens and FPA pairings, 12', 14' and 12", 14" at front end portions 54' and 54" of the system circuit and processing circuitry and output elements located at the back end 22' of the system circuit. The front end portion 54' of the system circuit, in certain embodiments, can include the lens 12', the FPA 14', the front-end stage 16' including the bias generator 18' and the pre-amp/integrator 20', a temperature sensor 38', an ADC 40' and a shutter 46'. Similarly, the front end portion 54" of the system circuit, in certain embodiments, can include the lens 12", the FPA 14", the front-end stage 16" including the bias generator 18" and the pre-amp/integrator 20", a temperature sensor 38", an ADC 40" and a shutter 46". It should be appreciated that the components of each of the front end portions 54' and 54" of the system circuit function and are used similarly as already detailed above with reference to FIG. 1.

In certain embodiments, the switching device 52 can be electrically positioned between the front-end stages 16', 16" and the back end 22' of the system circuit. As such, the switching device 52 separates the front end portions 54', 54" of the system circuit from the back end 22' of the circuit. In some embodiments, the system 50 can be incorporated on and/or within a single housing; however, the invention should not be limited to such. Alternatively, for example, the system 50, in certain embodiments, can be incorporated on and/or within a plurality of housings. In such embodiments, the back end 22' along with the switching device 52 can be incorporated within one of the housings. In turn, one or more of the front end portions 54', 54" (respectively including the lens and FPA pairings 12', 14' and 12", 14" and front-end stages 16' and 16") can be incorporated within one or more further housings. As such, the front end portions 54', 54" can be spaced away from the back end 22' and switching device 52 as desired, so as to provide images of views captured by the front end portions 54', 54" at a distance from the back end 22' and switching device 52. As shown in FIG. 2, in such embodiments, the back end 22' and switching device 52 can be respectively connected to the front end portions 54', 54" via one or more electrical buses (e.g., electrical buses 56' and 56"). While FIG. 2 shows separate electrical buses 56' and 56" for each respective front-end stage 16, 16" for clarity, one skilled in the art would appreciate that a single electrical bus could be alternatively used. In turn, one would eliminate the need for multiple electrical buses, e.g., 56', 56", thereby decreasing the physical connections running between each of the controller 28 and the processor 30 and the front end stages 16', 16".

As shown, the switching device 52 can be respectively connected to one of the lens and FPA pairings through inputs 58', 58". In certain embodiments, each of the inputs 58', 58" includes one or more inputs each respectively connected to one or more leads extending from the front-end stages 16', 16". In turn, for each of the lens and FPA pairings, 12', 14' and 12", 14", a number of analog signals can be delivered to the switching device 52 respectively across the set of inputs 58', 58". For example, if the switching device 52 is selectively connected to the front end portions 54', signals may be delivered not only from the pre-amp/integrator 20', but also from the bias generator 18' across the inputs 58'. As described above, the signals delivered from the bias generator 18' involve offset compensation information (e.g., the average bias current values with respect to detector element bias and temperature). In such cases where multiple sets of input signals are received by the switching device 52 when positioned in a given setting, the device 52, in certain embodiments, can involve a multiplexor (MUX). As used here, the MUX is an analog switch which only selects one of the lens and FPA pairings 12', 14' or 12", 14" at a time. In turn, the MUX used as the switching device 52 in the system 50 would be configured to operate according to one or more switching rates, alternatively switching between each of the lens and FPA pairings 12', 14' and 12", 14" at such switching rates.

Like the system 10 of FIG. 1, the back end 22' of the system 50 generally includes processing circuitry and one or more output elements. For example, the processing circuitry, in certain embodiments, can include one or more of a FPGA/CPLD controller 28' having a timing control portion, and a processor 30' (e.g., digital signal processor or computer processing unit). As described above with respect to FIG. 1, the processing circuitry can include an ADC 24; however, the invention should not be limited to such. Additionally, in certain embodiments, the output elements can include one or more of a display 32' and memory 36'. In addition, a graphics controller 34' and user interface 44' can be included in the back end 22' to function with the one or more output elements. The electrical components of the back end 22' of the circuit and their general functioning have been collectively described above with reference to FIG. 1. As such, it should be appreciated that the majority of these components are used similarly with respect to the system 50 of FIG. 2. However, because the processing circuitry is used to provide images from any of the lens and FPA pairings in the system 50, some of the components of the processing circuitry can involve increased functioning, as further described below.

As described above with respect to the system 10 of FIG. 1, one function of the FPGA/CPLD controller 28' is to enable offset compensation to be performed. As should be appreciated with respect to the system 50 of FIG. 2, this offset compensation can be enabled by the FPGA/CPLD controller 28' to any of the front end portions 54' or 54".

Additionally, in certain embodiments, the FPGA/CPLD controller 28' can also be used to control the switching speed or rate of the switching device 52. As should be appreciated, a conventional timing control (e.g., a clock) with a fairly high speed (e.g., MHz clock) can be employed within the FPGA/CPLD controller 28'. With respect to the system 50 exemplarily shown in FIG. 2, such a timing control (e.g., a 10 MHz clock) could enable the switching device 52 to sample each front end portion 54', 54" at a rate of five million samples per second. It should be appreciated that such a sampling rate is not generally needed to adequately maintain the optical quality of the images. Instead, for example, a lower sampling rate of several hundred thousand samples per second is more than enough for maintaining the optical quality. As a result, the number of lens and FPA pairings (i.e., front end portions) of the system 50 can generally be expanded as desired, while still being able to provide the needed sampling rates for maintaining the quality of the images from each of the pairings. For example, if the same 10 MHz clock is provided in the FPGA/CPLD controller 28' and the lens and FPA pairings were expanded to include a quantity of sixteen, the clock could still enable the switching device 52 to sample each lens and FPA pairing at a rate of six-hundred twenty-five thousand times samples per second. As such, the optical quality of the images created would be maintained, while increasing the number of images that could be viewed from the imaging system.

In certain embodiments, optical quality relates to that which is needed to adequately provide continuous video display of the images. For example, to adequately provide continuous video display for one of the images, the image may need to be updated at least 30 times per second. In turn, the video rate would be at least 30 frames per second. It should be appreciated that this rate is arbitrary, and can vary with different imaging systems. In turn, the rate of at least 30 frames per second is exemplarily provided herein and the invention should not be limited to such.

While the above suggests that the system 50 can be configured to sufficiently sample a significant quantity of lens and FPA pairings (e.g., via the FPGA/CPLD controller 28'), such is based on the underlying electronics of the back end 22' being sufficiently configured to support such functioning. For example, as should be appreciated, the processor 30' is needed to sufficiently process and track the information stemming from each of the lens and FPA pairings. In addition, the user interface 44' is needed to initiate offset compensation for each of the lens and FPA pairings, while the processor 30' is needed to further function in enabling such offset compensation. Further, the one or more output elements are needed to support the amount of information coming from the plurality of lens and FPA pairings. For example, in certain embodiments, the display 32' is provided as multi-view if the images from each of the lens and FPA pairings need to be provided simultaneously. Further, in certain embodiments, the memory 36' is sufficiently sized to accommodate the processed signals from each of the lens and FPA pairings. The manner in which the processor 30', the user interface 44', and the output elements are all sufficiently configured is well within the knowledge of one skilled in the art, and as such, is not described further herein.

As described above, in certain embodiments, the FPGA/CPLD controller 28' can be programmed to switch the switching device 52 automatically. In certain embodiments, the manner in which the switching device 52 samples the lens and FPA pairings can be controlled by the user. For example, the user may want the switching device 52 to sample only a particular number of the lens and FPA pairings. In certain embodiments, such functionality can be also provided via the user interface 44'.

As should be appreciated, the placement of the switching device 52 can be varied as desired. For example, the switching device 52 could just as well be placed between the FPAs 14' and 14" and the pre-amp integrators 20' and 20". Alternatively, the switching device 52 could be placed between electronic components of the back end 22'. However, as should be appreciated in such cases, the electronic components placed upstream from the switching device 52 would generally need to be repeated for each front end portion 54', 54" of the circuit, except for the bias generators 18', 18" if the FPAs are well matched, as described above. Regardless, so long as the switching device 52 is positioned early in the information data path of the circuit and functions in concert with the multiple view functioning of the system, one can vary the placement of the device 52 and still be able to prevent having to redundantly use electronic components placed downstream from the switching device 52.

In summary, with the circuit configuration of the system 50 of FIG. 2, the processing circuitry and the one or more output elements of the back end 22' of the system circuit will not need to be redundantly represented for each of the lens and FPA pairing circuit paths. Since the switching device 52 is switched prior to the back end 22' of the system circuit, the back end 22' only receives signals from one of the lens and FPA pairing at any given time. As a result, only a single set of processing circuitry and output elements is warranted. In turn, the corresponding circuit of the multiple view infrared imaging system 50 can be reduced in size and complexity, enabling conservation of volumetric space of the system 50, reduction of total mass of the system 50, and reduction of power demand of the system 50, thereby conserving battery life of the system 50.

Further, by utilizing the switching device 52 in combination with such above-mentioned single set of processing circuitry and output elements, the signals stemming from any of the lens and FPA pairings can be selectively delivered based on the positioning of the device 52. If, in certain embodiments, the device 52 is controlled by a timing controller having a fairly high speed, the system 50 can provide for continual monitoring of a significant plurality of lens and FPA pairings without incurring drop-off in the optical quality of the images. In turn, the system 50 can be designed not only to provide images from each of the lens and FPA pairings, but also to effectively maintain such images over time via the back end 22' of the system 50.

It will be appreciated the embodiments of the present invention can take many forms. The true essence and spirit of these embodiments of the invention are defined in the appended claims, and it is not intended the embodiment of the invention presented herein should limit the scope thereof.

What is claimed is:

1. An infrared imaging system comprising:
  a plurality of lenses, each of the lenses configured to focus on a distinct view of a plurality of views, each of the lenses configured to receive image information in the form of infrared energy from the corresponding distinct view, each of the lenses configured to pass the image information;
  a plurality of infrared focal plane arrays, the arrays each paired with one of the plurality of lenses, each of the lenses adapted to direct the infrared energy from the corresponding distinct view onto its paired array;
  a processing circuitry that is selectively connectable to any one of the arrays, wherein the circuitry when selectively connected to one of the arrays is adapted to process signals stemming from the one array; and
  a switching device located between the processing circuitry and the plurality of arrays, wherein the switching device is electrically connected to the processing circuitry, and wherein the processing circuitry is selectively connectable to any one of the arrays via the switching device.

2. The system of claim 1, wherein the processing circuitry comprises one or more of a controller and a processor.

3. The system of claim 2, wherein the controller is a field-programmable gate array/complex programmable logic device controller including a timing control portion.

4. The system of claim 2, wherein the processor is one or more of a digital signal processor and a computer processing unit.

5. The system of claim 1, further comprising one or more output elements connected to the processing circuitry.

6. The system of claim 5, wherein the output elements comprises one or more of a display and memory, and wherein the display is adapted to create an image from output of the processing circuitry and the memory is adapted for storing the output of the processing circuitry.

7. The system of claim 6, wherein the display has multi-view functionality, wherein the display is configured for maintaining images thereon from each of the views focused on by the lenses.

8. The system of claim 1, further comprising sets of conditioning circuitry, wherein each set of conditioning circuitry is connected to one of the arrays, and wherein the switching device is selectively connectable to any one of the arrays via the corresponding conditioning circuitry set.

9. The system of claim 8, wherein each conditioning circuitry set comprises one or more of a bias generator and a pre-amplifier/integrator.

10. The system of claim 1, wherein the switching device is a multiplexor.

11. The system of claim 1, wherein the processing circuitry comprises a controller with timing control, wherein the controller is electrically connected to the switching device, and wherein the timing control is adapted to regulate a sampling rate of the switching device.

12. The system of claim 11, wherein the sampling rate of the switching device enables sampling of one or more of the lens and array pairings to be maintained over a period of time, and wherein the sampling rate provides sufficient sampling of the one or more lens and array pairings so as to maintain optical quality of the images created therefrom.

13. The system of claim 12, wherein the optical quality involves adequate provision of continuous video display of the images.

14. The system of claim 12, further comprising a user interface electrically connected to the processing circuitry, wherein the user interface includes functionality by which a user can select the one or more lens and array pairings to be sampled.

15. The system of claim 1, further comprising one or more housings, wherein the processing circuitry is incorporated within one of the housings.

16. The system of claim 15, wherein each of the lens and array pairings are incorporated on or within the one housing.

17. The system of claim 15, wherein each of the lens and array pairings are incorporated on or within further housings not of the one housing.

18. The system of claim 17, wherein at least one electrical bus runs between the one housing and the further housings.

19. The system of claim 1, wherein the arrays comprise microbolometer arrays.

20. An infrared imaging system comprising:
  a plurality of lenses, each of the lenses configured to focus on a distinct view of a plurality of views, each of the lenses configured to receive image information in the form of infrared energy from the corresponding distinct view, each of the lenses configured to pass the image information;
  a plurality of infrared focal plane arrays, the arrays each paired with one of the plurality of lenses, each of the lenses adapted to direct the infrared energy from the corresponding distinct view onto its paired array;

one or more output elements that are selectively connectable to any one of the arrays, the output elements comprising one or more of a display and memory, wherein the display when selectively connected to one of the arrays is adapted to create an image from the signals stemming from the one array, wherein the memory when selectively connected to one of the arrays is adapted for storing the signals stemming from the one array; and a switching device located between the one or more output elements and the plurality of arrays, wherein the switching device is electrically connected to the one or more output elements, and wherein the one or more output elements are selectively connectable to any one of the arrays via the switching device.

21. The system of claim 20, wherein the display has multi-view functionality, wherein the display is configured for maintaining images thereon from each of the views focused on by the lenses.

22. The system of claim 20, further comprising sets of conditioning circuitry, wherein each set of conditioning circuitry is connected to one of the arrays, and wherein the switching device is selectively connectable to any one of the arrays via the corresponding conditioning circuitry set.

23. The system of claim 22, wherein each conditioning circuitry set comprises one or more of a bias generator and a pre-amplifier/integrator.

24. The system of claim 20, further comprising processing circuitry, wherein the processing circuitry is connected between the one or more output elements and the switching device.

25. The system of claim 24, wherein the processing circuitry comprises one or more of a controller and a processor.

26. The system of claim 24, wherein the processing circuitry comprises a controller with timing control, wherein the controller is electrically connected to the switching device, and wherein the timing control is adapted to regulate a sampling rate of the switching device.

27. The system of claim 26, wherein the sampling rate of the switching device enables sampling of one or more of the lens and array pairings to be maintained over a period of time, and wherein the sampling rate provides sufficient sampling of the one or more lens and array pairings so as to maintain optical quality of the images created therefrom.

28. The system of claim 27, wherein the optical quality involves adequate provision of continuous video display of the images.

29. The system of claim 27, further comprising a user interface electrically connected to the processing circuitry, wherein the user interface includes functionality by which a user can select the one or more lens and array pairings to be sampled.

30. The system of claim 20, further comprising one or more housings, wherein the processing circuitry is incorporated within one of the housings.

31. The system of claim 30, wherein each of the lens and array pairings are incorporated on or within the one housing.

32. The system of claim 31, wherein each of the lens and array pairings are incorporated on or within further housings not of the one housing.

33. The system of claim 20, wherein the arrays comprise microbolometer arrays.

\* \* \* \* \*